(12) United States Patent
Peyerl et al.

(10) Patent No.: US 7,008,588 B2
(45) Date of Patent: Mar. 7, 2006

(54) APPARATUS AND METHOD FOR FORMING PANELS FROM MOLDABLE MATERIAL

(75) Inventors: Friedrich Peyerl, Albuquerque, NM (US); Joseph Andrew Cromey, Los Lunes, NM (US); Donald Duane Schulz, Rio Rancho, NM (US); Robert Timothy Deblassie, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 10/617,595

(22) Filed: Jul. 11, 2003

(65) Prior Publication Data

US 2005/0006817 A1 Jan. 13, 2005

(51) Int. Cl.
*B29C 43/44* (2006.01)

(52) U.S. Cl. .......................... 264/316; 264/319; 425/89; 425/364 R

(58) Field of Classification Search ................ 264/316, 264/319; 425/89, 364 R, 324.1, 447; B29C 43/44
See application file for complete search history.

(56) References Cited

U.S. PATENT DOCUMENTS

| | | | | |
|---|---|---|---|---|
| 3,514,507 A | * | 5/1970 | Van Dop et al. | 425/89 |
| 3,799,808 A | * | 3/1974 | Hancock | 264/316 |
| 4,012,160 A | | 3/1977 | Parker | |
| 4,106,764 A | | 8/1978 | Tamura | |
| 4,120,626 A | * | 10/1978 | Keller | 425/89 |
| 4,267,134 A | * | 5/1981 | Kolakowski et al. | 264/46.2 |
| 4,603,536 A | | 8/1986 | de la Poype | |
| 5,083,655 A | | 1/1992 | Becker | |
| 5,198,243 A | * | 3/1993 | Shimizu et al. | 425/230 |
| 5,305,963 A | | 4/1994 | Harvey, III et al. | |
| 5,344,280 A | | 9/1994 | Langenbrunner et al. | |
| 5,458,477 A | * | 10/1995 | Kemerer et al. | 425/371 |
| 6,200,611 B1 | | 3/2001 | Ganesan et al. | |
| 6,298,529 B1 | | 10/2001 | Aube et al. | |
| 6,416,047 B1 | | 7/2002 | Pfankuch | |

FOREIGN PATENT DOCUMENTS

JP 10076541 A * 3/1998

OTHER PUBLICATIONS

Partial machine translation of JP 10-076541 A obtained from the JPO website.*

* cited by examiner

*Primary Examiner*—Robert B. Davis
(74) *Attorney, Agent, or Firm*—Donald E. Hasse; Hasse & Nesbitt LLC; John B. Woodard

(57) ABSTRACT

An apparatus for forming panels from moldable material comprising: a material storage and feeding container for placing moldable material on a sheet of peel ply material on top of a conveyor. The conveyor has a roughened surface for gripping the sheet of peel ply material. The moldable material is leveled by a sizing plate which also places a second sheet of peel ply material over the moldable material to form a web. The web is compressed in a compression zone and is stabilized in thickness to form panels of compressed, dimensionally stabilized material as it is moved by the conveyor. Also disclosed is a method for making such panels from moldable material.

34 Claims, 3 Drawing Sheets

APPARATUS AND METHOD FOR FORMING PANELS FROM MOLDABLE MATERIAL

BACKGROUND OF THE INVENTION

The present invention relates to an apparatus and method for forming panels, such as protective and sound suppressing liners, from moldable materials. Such liners are primarily used for aircraft engines but can be used in a variety of industries where sound suppression or protection from flying objects is needed. In the aircraft industry, panels made by the apparatus and method of this invention are primarily used to suppress sound and to protect aircraft and aircraft engines from ice that is thrown off the fan blades of ducted aircraft engines, such as gas turbine engines.

Prior to this invention, the panels used in the liners were manufactured by hand packing a dry thixotropic paste into a mold cavity. The moldable material usually used has the consistency of dry spackling compound. The material is smoothed with a cylindrical piece of aluminum and shaved to the proper dimensional height using a sharp spatula. This methodology presents several problems in producing dimensionally consistent and correct panels. In addition the material usually used can be hazardous, and, therefore, hand working of the material is not desirable.

When hand packing the moldable material, a polytetrafluoroethylene tape is used to coat the mold surface and keep the moldable material from sticking to the mold surface during elevated temperature cure. The use of conventional polytetrafluoroethylene film is not possible due to molding pressure and manipulation of the material, which tears and wrinkles the polytetrafluoroethylene film. Any tears or wrinkles translate to a similar appearance in the part, and are considered as a nonconformance to engineering specifications. The use of polytetrafluoroethylene tape can be very time consuming in that its application has to be seamless and without wrinkles. This is difficult to achieve in a contoured mold cavity.

These issues can lead to a final product that varies in quality and, particularly, in thickness. Parts that do not meet thickness requirements have to be repaired at significant cost or, in some cases, scrapped. Hand packing can also leave non-filled cavities that have to be repaired. Thus there is a need for an improved apparatus and process for forming panels from moldable material.

BRIEF DESCRIPTION OF THE INVENTION

The present invention relates to an apparatus to form panels from moldable material comprising:
  a) a material storage and feeding container for placing moldable material on a first sheet of peel ply material atop a conveyor;
  b) said conveyor having a roughened surface for creating friction between the first sheet of peel ply material thereon and said conveyor, said conveyor passing over a base plate having one distal end placed so that said conveyor passes under said material storage and feeding container and a second distal end adjacent where said conveyor departs the first sheet of peel ply material;
  c) a sizing plate under which a second sheet of peel ply material passes, said sizing plate configured to regulate the thickness of the moldable material as it exits said material storage and feeding container, said sizing plate being positioned to place the second sheet of peel ply material over the moldable material to form a web having a bottom side and a top side, the bottom side of the web formed by the first sheet of peel ply material and the top side formed by the second sheet of peel ply material;
  d) a compression zone having a plurality of sides and at least one compression plate positioned to further compress the moldable material;
  e) a friction reducing material lining said compression plate and a plurality of sides of said compression zone; and
  f) a receiving device for receiving the web from said conveyor.

In one aspect, the invention relates to an apparatus to form liners for aircraft engines from moldable material comprising:
  a) a material storage and feeding container comprising an adjustable grid for placing and sizing moldable material on a first sheet of peel ply material atop a conveyor;
  b) said grid being adjustable to regulate the thickness of the dispensed moldable material;
  c) said conveyor having a roughened surface for gripping the first sheet of peel ply material thereon, said conveyor passing over a base plate having one distal end placed so that said material storage and feeding container can dispense moldable material on said conveyor and a second distal end adjacent where said conveyor departs the first sheet of peel ply material;
  d) a sizing plate under which the second sheet of peel ply material passes, said sizing plate configured to regulate the thickness of the moldable material as it exits said material storage and feeding container, said sizing plate being positioned to place the second sheet of peel ply material over the moldable material to form a web having a bottom side and a top side, the bottom side of the web formed by the first sheet of peel ply material covered by the dispensed moldable material and the top side formed by the second sheet of peel ply material covering the moldable material, said sizing plate configured to prevent breaks and voids in the moldable material, said sizing plate being positioned to prevent excess moldable material leaving said material holding and feeding container;
  e) a compression zone having a plurality of sides and at least one compression plate positioned to further compress the moldable material;
  f) a friction reducing material lining said compression plate and a plurality of sides of said compression zone to reduce friction forces between the top side of the web, the sides of the web and the corresponding inner surfaces of said compression zone; and
  g) a receiving device for receiving the web from said conveyor.

In another aspect, the invention relates to a method for making panels from moldable material comprising:
  a) dispensing and leveling a moldable material on a first sheet of peel ply material placed on a conveyor;
  b) providing a roughened surface on the conveyor to create gripping action between the conveyor and the first sheet of peel ply material;
  c) providing a sizing plate and configuring the sizing plate to further level the moldable material and place a second sheet of peel ply material on top of the moldable material to form a web;
  d) moving the web with the conveyor;
  e) providing a compression zone to compress the moldable material of the web into a given shape and size; and f) removing the web from the conveyor.

In yet another aspect, the invention relates to a method for making sound insulating and protective liners for aircraft engines comprising:
a) feeding a first sheet of peel ply material onto a conveyor and dispensing and leveling a moldable material on top of the peel ply material;
b) providing a roughened surface on the conveyor to create a gripping action between the conveyor and the first sheet of peel ply material;
c) providing a sizing plate and configuring the sizing plate to further level the web and prevent voids and cracks in the moldable material, configuring the sizing plate and second sheet of peel ply material to place the second sheet of peel ply material on top of the moldable material to form a web having a bottom side and a top side, the bottom side of the web formed by the first sheet of peel ply material covered by the dispensed moldable material and the top side formed by the second sheet of peel ply material covering the moldable material, and configuring the sizing plate to prevent excess moldable material leaving the material storage and feeding container;
d) moving the web with the conveyor;
e) providing a compression zone to compress the moldable material of the web into a given shape and size, and lining the compression zone with friction reducing material; and
f) removing the web from said conveyor.

DETAILED DESCRIPTION OF THE INVENTION

Figure 1:
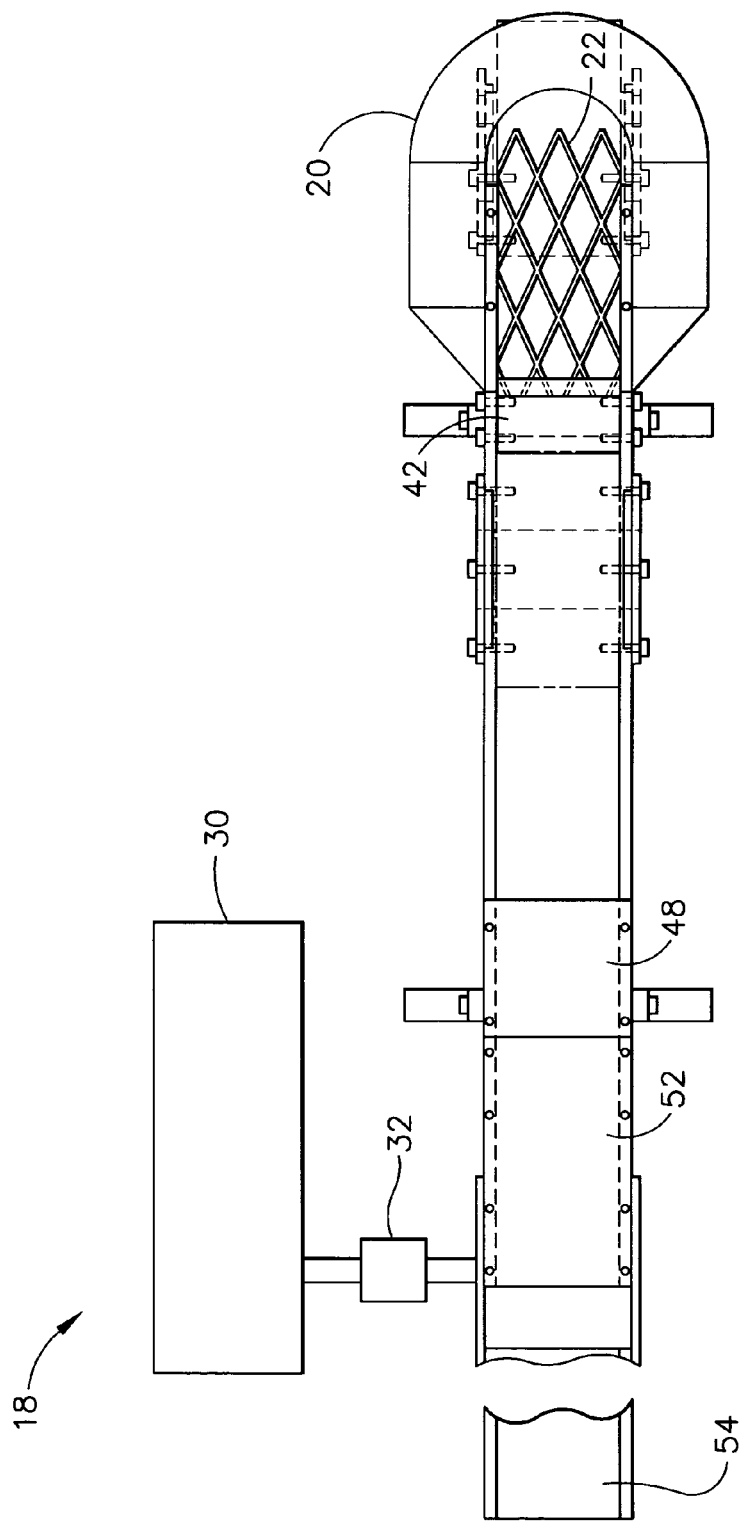
FIG. 1 is a top view of the apparatus according to one embodiment of the invention.

The invention is applicable to a range of industrial processes, and comprises an apparatus to form panels from moldable material of reliable shape and quality possessing properties that are consistent from panel to panel. The panels can be used to make protective and sound suppressing liners for gas turbine aircraft engines.

The apparatus comprises a material storage and feeding container that employs a movable grid that can be adjusted to dispense moldable material uniformly and at nearly constant thickness, and a conveyor with a roughened surface particularly chosen to grip a first sheet of peel ply material. The first sheet of peel ply material is placed on the conveyor, and the moldable material is dispensed on it. The invention further comprises a sizing plate configured to regulate the thickness of the moldable material as it exits the material storage and feeding container. The sizing plate smoothes and corrects any inconsistencies in the dispensed moldable material and applies a second sheet of peel ply material over the dispensed material creating a web comprising the moldable material between the sheets of peel ply material.

Following the construction of the web, a compression zone having a plurality of sides and at least one compression plate further compresses the moldable material. The compression plate or series of plates is set at an angle to force the moldable material into the required shape with a uniform but adjustable thickness as it is moved along the length of the system by the conveyor. A constant thickness area further stabilizes the web to a given thickness and prevents any rebound in thickness after the compression operation. The processed web is then moved onto the receiving device.

In one embodiment, the receiving device is a fiberglass sheet, and the web is further processed by removing at least a portion of the web and placing the removed portion in a shaping and curing mold. A heat activated curing process then cures the moldable material stabilizing the properties and dimensions of the part.

Alternatively, the receiving device can be a mold itself with the processed web being directly placed into the mold while still a part of the web. The mold is then closed and the material is cured.

In some embodiments, the channel along which the web moves may be curved and heat may be applied as the web moves along the channel to cure the moldable material, thus eliminating the molding step.

The method for preparing the panels described above is also a part of the invention. In one aspect, the invention employs a method for reducing the need for direct personnel exposure to the moldable material, which can be hazardous. The invention also reduces the need for handpacking material into molds with its attendant risk of repetitive motion injury.

In reference to the drawings, identical reference numerals and letters designate the same or corresponding parts throughout the figures shown in the drawings.

Figure 2:
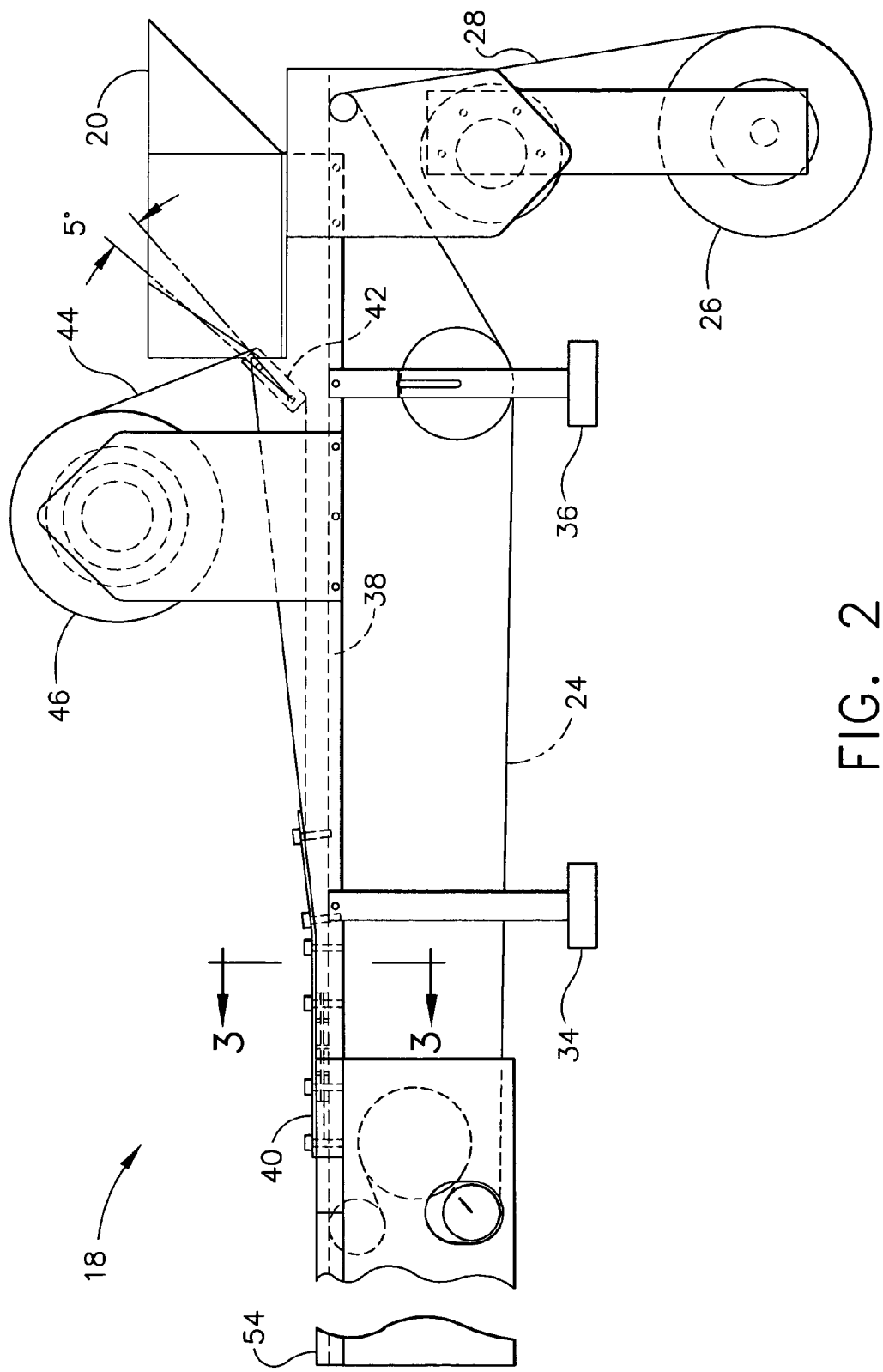
FIG. 2 is a side view of the apparatus of FIG. 1.

Referring to the drawings, FIG. 2 shows a side view of the construction and operation of one apparatus 18 of the invention. The apparatus 18 is constructed on a front support 34 and a rear support 36. A base plate 38, typically made of metal, is positioned over the front support 34 and the rear support 36. The front and rear supports 34, 36 and the base plate 38 together form the support structure for the apparatus 18.

FIG. 1 depicts a top view of an embodiment of the apparatus corresponding to FIG. 2. In this embodiment, the material storage and feeding container 20 is funnel shaped and has a diamond grate that forms a grid 22 used to size or regulate the thickness of the moldable material 56 (shown in FIG. 3) dispensate as it is fed onto a conveyor 24 (shown in FIG. 2). This grid 22 may be chosen in a variety of shapes, and its position shown in FIG. 1 is adjustable inside the material storage and feeding container 20. Adjustment of the grid 22 determines the thickness and the levelness of the moldable material as it is dispensed and moved by the conveyor 24 from under the material storage and feeding container 20.

Referring to FIG. 2, the path of the conveyor 24 can be seen. At the bottom of FIG. 2 is the bottom peel ply roller 26. A first sheet of peel ply material 28 from this roller 26 is fed onto the end of the conveyor 24 before the conveyor 24 passes under the material storage and feeding container 20 in such a manner that the moldable material dispensed by the material storage and feeding container 20 is placed on the first sheet of peel ply material 28.

As the dispensed moldable material moves out of the material storage and feeding container 20, a sizing plate 42 is employed to further level and smooth the surface of the dispensed moldable material. The sizing plate 42 prevents excess material from leaving the material storage and feeding container 20. In some embodiments, the position of this sizing plate 42 affects the quality of the resulting web of material. In the present embodiment, the sizing plate 42 is typically placed at an angle of about 45 degrees above the conveyor 24 with the angle opening toward the material storage and feeding container 20. The sizing plate 42 also places a second sheet of peel ply material 44, from the top peel ply roller 46, on top of the dispensed moldable material. The second sheet of peel ply material 44 is directed from the top peel ply roller 46 under the sizing plate 42 where it is placed on top of the moldable material by the pressure of the sizing plate 42 as it levels and smoothes the surface of the dispensed moldable material. A web 58 (shown in FIG. 3) is thereby formed comprising the first sheet of peel ply material 28 as the bottom layer, the second sheet of peel ply material 44 as the top layer, and the moldable material 56 (shown in FIG. 3) as the intermediate layer. In one embodiment, the moldable material is a structural adhesive potting compound formulated for curing at about 250° F. (about 121° C.) for about 2.5 hours, such as Scotch-Weld Potting Compound EC 3439 HS AF Structural Adhesive, available from the 3M Company. In another embodiment, the peel ply material is a woven nylon about 4 inches (about 10 cm) in width, such as Peel Ply Style 52006, Code 51789, Color International Orange, available from Precision Fabrics Company.

As the web is pulled along the base plate 38 by the conveyor 24, the web is pulled through at least one compression plate 40 that is configured to compress the web to a reduced thickness. There can be a significant drag on the conveyor 24 and web due to the sizing process described above. The compression plate 40 forming a compression zone 48 (shown in FIG. 1) can create even more drag as the moldable material is compressed to a desired thickness. The moldable material is sandwiched between the sheets of peel ply material to facilitate movement through the compression zone 48, but the drag is increased by the surface against which the peel ply material moves. In some embodiments, the top and sides of the compression zone 48 are lined with a friction reducing material 50 (shown in FIG. 3). In one embodiment, the friction reducing material is polytetrafluoroethylene.

As the moldable material emerges from the compression zone 48, it is sandwiched between the sheets of peel ply material. In some circumstances moldable materials have a tendency to rebound after they are compressed. In such circumstances, a constant thickness area 52 (shown in FIG. 1) can be employed to stabilize the web and maintain its shape. This constant thickness area 52 is comprised of a top and sides that contain the web constraining it to remain at constant cross sectional dimension, the cross sectional dimension being taken perpendicular to the direction of movement of the conveyor. The plates forming the constant thickness area can also cause significant drag as the sandwiched web moves through them. To reduce this drag, the plates forming the constant thickness area 52 can also be lined with friction reducing material. In one embodiment, this material is polytetrafluoroethylene.

Figure 3:
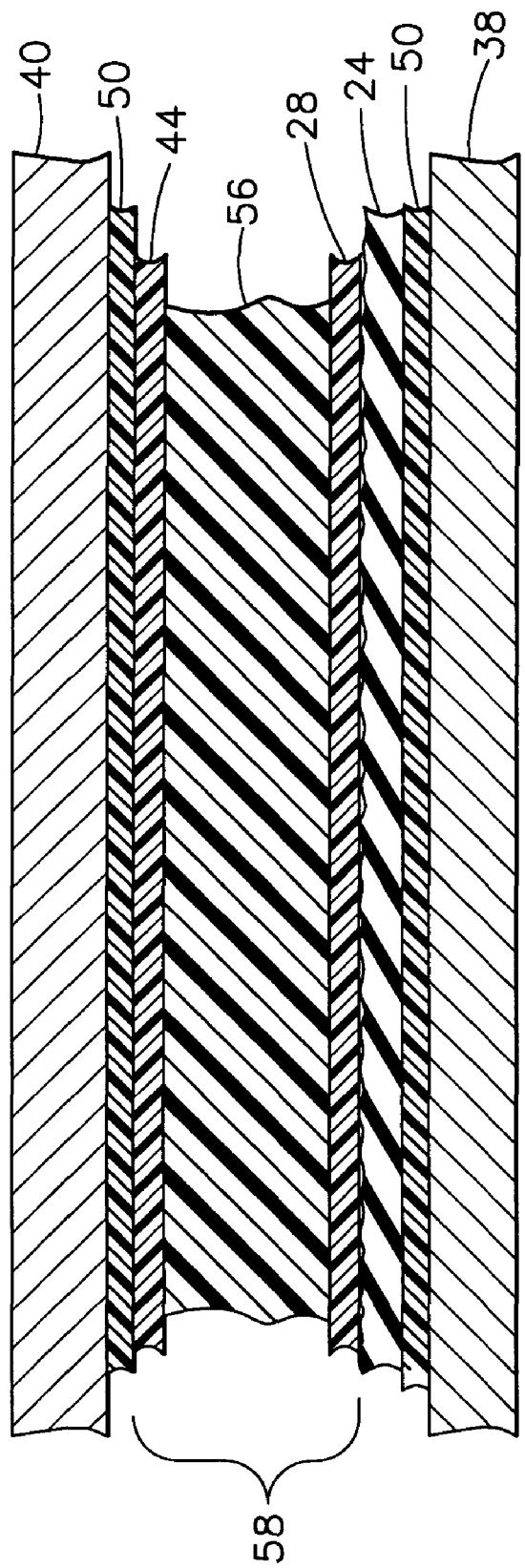
FIG. 3 is a cross-sectional, schematic view of a portion of the apparatus of FIG. 2 and a web comprising a moldable material between sheets of peel ply material.

FIG. 3 is a cross-sectional, schematic view of a portion of the apparatus of FIG. 2 along the constant thickness area 52. As shown in FIG. 3, a web 58 comprises a moldable material 56 compressed between a first sheet of peel ply material 28 and a second sheet of peel ply material 44. The first sheet of peel ply material 28 is located on top of conveyor 24. Friction reducing material 50 is placed between conveyor 24 and base plate 38. Friction reducing material 50 is also placed between the second sheet of peel ply material 44 and compression plate 40.

In one embodiment, the web 58 having been stabilized in the constant thickness area 52, the conveyor 24 drops away from the bottom of the web, and the web is then moved onto a receiving device 54. In one embodiment, the receiving device 54 is a sheet of fiberglass supported by an extension plate. In this embodiment, the apparatus is stopped when the web driven onto the fiberglass is of sufficient length. The desired portion of the web is removed and is placed in a curing mold to establish additional shaping and dimensional stability. In this way a cure is effected and the properties and dimensions of the part are permanently stabilized.

As shown in FIG. 1, the conveyor 24 is typically powered by a variable speed motor 30, which turns the conveyor through a coupling 32. One embodiment uses the motor 30 to drive the conveyor 24, which in turn moves the web 58. Since significant drag can be caused on the conveyor 24 by the web 58 passing through the apparatus, it is desirable to have a strong grip between the conveyor 24 and the first sheet of peel ply material 28. To accomplish this, the surface roughness of the conveyor 24 is chosen for its gripping properties on the first sheet of peel ply material 28. In one embodiment, sanding belts are a convenient source of variable roughness conveyors. These can be obtained commercially in a wide range of roughness that can be matched to the needs of a particular peel ply material.

The peel ply material is typically chosen so that it will not stretch when gripped by the conveyor and is strong enough to prevent ripping or tearing. Further, the peel ply material acts in at least one embodiment as surface preparation material during the curing process. Thus, the material is typically chosen to be stable at molding and curing temperatures. In one embodiment, the peel ply material is woven nylon.

In another embodiment, the processed web is not removed from the apparatus for curing and molding. Rather, the web is dispensed or driven directly into a mold after being processed. The mold is then removed or the curing action can take place in situ.

In another embodiment, the processed web is confined to a shaped track on which heat is applied to cure the material. The web is thus shaped and cured without being removed from the receiving device as it moves from the constant thickness area.

The present invention thus provides one or more of the following advantages: decreased manufacturing time, reduced cost, increased throughput, improved dimensional and cosmetic quality of final product, reduced repetitive stress disorder complaints filed by operators, reduced operator exposure to hazardous material, and reduced use of expertise and process materials.

This invention has been explained with respect to the details, arrangements of components and certain specific embodiments shown in the accompanying drawings. These embodiments can be modified by those skilled in the art without departing from the spirit and scope of this invention. Thus, the appended claims are intended to be interpreted to cover apparatus and methods that do not depart from the spirit and scope of this invention.

Those skilled in the art will realize that this invention is capable of embodiments different from those shown and described. It will be appreciated that the detail of the structure of this apparatus and methodology can be changed in various ways without departing from the scope of this invention. Accordingly, the drawings and detailed description of the preferred embodiments are to be regarded as including such equivalents as do not depart from the scope of the invention.

We claim:

1. An apparatus to form panels from moldable material comprising:

a) a material storage and feeding container for placing moldable material on a first sheet of peel ply material atop a conveyor;

b) said conveyor having a roughened surface for creating friction between the first sheet of peel ply material thereon and said conveyor, said conveyor passing over a base plate having one distal end placed so that said conveyor passes under said material storage and feeding container and a second distal end adjacent where said conveyor departs the first sheet of peel ply material;

c) a sizing plate under which a second sheet of peel ply material passes, said sizing plate configured to regulate the thickness of the moldable material as it exits said material storage and feeding container, said sizing plate being positioned to place the second sheet of peel ply material over the moldable material to form a web having a bottom side and a top side, the bottom side of the web formed by the first sheet of peel ply material and the top side formed by the second sheet of peel ply material;

d) a compression zone having a plurality of sides and at least one compression plate positioned to further compress the moldable material;

e) a friction reducing material lining said compression plate and a plurality of sides of said compression zone; and f) a receiving device for receiving the web from said conveyor.

2. The apparatus of claim 1 wherein said material storage and feeding container further comprises a grid for dispensing and leveling the moldable material on the first sheet of peel ply material that is fed onto said conveyor.

3. The apparatus of claim 2 wherein said grid is adjustable to regulate the thickness of the discharge of moldable material from said material storage and feeding container.

4. The apparatus of claim 1 wherein said sizing plate is configured to prevent breaks and voids in the moldable material.

5. The apparatus of claim 4 wherein said sizing plate is angled above said conveyor with its top toward said material storage and feeding container to prevent excess moldable material leaving said material storage and feeding container.

6. The apparatus of claim 5 wherein the angle of said sizing plate is acute and is about 45 degrees above said conveyor with the acute angle opening toward said material storage and feeding container.

7. The apparatus of claim 1 wherein a constant thickness area is adjacent said compression zone and receives the web from said compression zone, said constant thickness area formed by at least one stabilizing plate and a plurality of sides.

8. The apparatus of claim 7 wherein said stabilizing plate and sides of said constant thickness area are lined with friction reducing material, said constant thickness area stabilizing the web in size.

9. The apparatus of claim 8 wherein said friction reducing material lining said constant thickness area is polytetrafluoroethylene.

10. The apparatus of claim 1 wherein said roughened surface of said conveyor securely grips the first sheet of peel ply material.

11. The apparatus of claim 10 wherein said conveyor is a sanding belt.

12. The apparatus of claim 10 wherein the first sheet of peel ply material is chosen to prevent breaking of and voids in the moldable material deposited on said first sheet of peel ply material.

13. The apparatus of claim 12 wherein the first sheet of peel ply material forming the bottom side of the web is made of a different substance from the second sheet of peel ply material forming the top side of the web.

14. The apparatus of claim 12 wherein the first sheet of peel ply material forming the bottom side of the web is made of the same material as the second sheet of peel ply material forming the top side of the web.

15. The apparatus of claim 12 wherein the peel ply material is woven nylon.

16. The apparatus of claim 1 wherein said friction reducing material lining said compression zone is polytetrafluoroethylene.

17. The apparatus of claim 1 wherein said apparatus can be stopped at selected times to allow removal of the processed portion of the web.

18. The apparatus of claim 17 wherein said apparatus is stopped and at least a portion of the web is removed for further processing in molds.

19. The apparatus of claim 1 wherein the moldable material is cured by the application of heat while in a forming mold.

20. The apparatus of claim 1 wherein said receiving device is a device for molding the moldable material and the moldable material is dispensed directly into said device for molding.

21. The apparatus of claim 1 further comprising a heated zone for curing said moldable material.

22. The apparatus of claim 21 wherein said heated zone is integral with said constant thickness area.

23. The apparatus of claim 1 wherein said receiving device is a shaped track for forming and shaping the moldable material.

24. The apparatus of claim 23 further comprising a heating zone to cure the moldable material.

25. The apparatus of claim 23 wherein said shaped track is integral with a constant thickness area adjacent said compression zone receiving the web from said compression zone, said constant thickness area formed by at least one stabilizing plate and a plurality of sides.

26. The apparatus of claim 1 wherein the first sheet of peel ply material is used as a molding release agent in preparing a mold surface.

27. The apparatus of claim 1 wherein the second sheet of peel ply material is used as a molding release agent in preparing a mold surface.

28. An apparatus to form liners for aircraft engines from moldable material comprising:

a) a material storage and feeding container comprising an adjustable grid for placing and sizing moldable material on a first sheet of peel ply material atop a conveyor;

b) said grid being adjustable to regulate the thickness of the dispensed moldable material;

c) said conveyor having a roughened surface for gripping the first sheet of peel ply material thereon, said conveyor passing over a base plate having one distal end placed so that said material storage and feeding container can dispense moldable material on said conveyor and a second distal end adjacent where said conveyor departs the first sheet of peel ply material;

d) a sizing plate under which the second sheet of peel ply material passes, said sizing plate configured to regulate the thickness of the moldable material as it exits said material storage and feeding container, said sizing plate being positioned to place the second sheet of peel ply material over the moldable material to form a web having a bottom side and a top side, the bottom side of the web formed by the first sheet of peel ply material covered by the dispensed moldable material and the top side formed by the second sheet of peel ply material covering the moldable material, said sizing plate configured to prevent breaks and voids in the moldable material, said sizing plate being positioned to prevent excess moldable material leaving said material holding and feeding container;

e) a compression zone having a plurality of sides and at least one compression plate positioned to further compress the moldable material;

f) a friction reducing material lining said compression plate and a plurality of sides of said compression zone to reduce friction forces between the top side of the web, the sides of the web and the corresponding inner surfaces of said compression zone; and g) a receiving device for receiving the web from said conveyor.

29. The apparatus of claim 28 wherein a constant thickness area is adjacent said compression zone and receives the web from said compression zone, said constant thickness area formed by at least one stabilizing plate and a plurality of sides.

30. The apparatus of claim 29 wherein said constant thickness area is lined with friction reducing material.

31. A method for making panels from moldable material comprising:
 a) dispensing and leveling a moldable material on a first sheet of peel ply material placed on a conveyor;
 b) providing a roughened surface on the conveyor to create gripping action between the conveyor and the first sheet of peel ply material;
 c) providing a sizing plate and configuring the sizing plate to further level the moldable material and place a second sheet of peel ply material on top of the moldable material to form a web;
 d) moving the web with the conveyor;
 e) providing a compression zone to compress the moldable material of the web into a given shape and size; and
 f) removing the web from the conveyor.

32. The method of claim 31 comprising providing a constant thickness area to stabilize the web in size, the constant thickness area being adjacent the compression zone and receiving the web from the compression zone, the constant thickness area being lined with friction reducing material.

33. A method for making sound insulating and protective liners for aircraft engines comprising:
 a) feeding a first sheet of peel ply material onto a conveyor and dispensing and leveling a moldable material on top of the peel ply material;
 b) providing a roughened surface on the conveyor to create a gripping action between the conveyor and the first sheet of peel ply material;
 c) providing a sizing plate and configuring the sizing plate to further level the web and prevent voids and cracks in the moldable material, configuring the sizing plate and second sheet of peel ply material to place the second sheet of peel ply material on top of the moldable material to form a web having a bottom side and a top side, the bottom side of the web formed by the first sheet of peel ply material covered by the dispensed moldable material and the top side formed by the second sheet of peel ply material covering the moldable material, and configuring the sizing plate to prevent excess moldable material leaving the material storage and feeding container;
 d) moving the web with the conveyor;
 e) providing a compression zone to compress the moldable material of the web into a given shape and size, and lining the compression zone with friction reducing material; and
 f) removing the web from said conveyor.

34. The method of claim 33 comprising providing a constant thickness area to stabilize the web in size, the constant thickness area being adjacent the compression zone and receiving the web from the compression zone, the constant thickness area being lined with friction reducing material.

* * * * *